United States Patent
Zou et al.

(10) Patent No.: US 12,465,626 B2
(45) Date of Patent: Nov. 11, 2025

(54) TRADITIONAL CHINESE MEDICINE COMPOSITION WITH IMPROVING COGNITION EFFECT, PREPARATION METHOD THEREOF AND TRADITIONAL CHINESE MEDICINE PREPARATION

(71) Applicants: Chenland Nutritionals, Inc., Irvine, CA (US); Qingdao Chenland Biological Technology Co., ltd., Qingdao (CN)

(72) Inventors: Shengcan Zou, Qingdao (CN); Shanglong Wang, Qingdao (CN); Xin Li, Qingdao (CN); Lei Zong, Qingdao (CN); Jiancheng Zong, Qingdao (CN); Zengliang Zhang, Qingdao (CN)

(73) Assignees: Qingdao Chenland Health Industry Group Co., Ltd., Qingdao (CN); Chenland Nutritionals, Inc., Irvine, CA (US)

( * ) Notice: Subject to any disclaimer, the term of this patent is extended or adjusted under 35 U.S.C. 154(b) by 842 days.

(21) Appl. No.: 17/693,327

(22) Filed: Mar. 12, 2022

(65) Prior Publication Data
US 2022/0226413 A1 Jul. 21, 2022

Related U.S. Application Data

(63) Continuation of application No. PCT/CN2019/126530, filed on Dec. 19, 2019.

(30) Foreign Application Priority Data

Nov. 14, 2019 (CN) .......................... 201911113149.X

(51) Int. Cl.
A61K 36/00 (2006.01)
A61K 36/64 (2006.01)
A61K 36/69 (2006.01)
A61K 36/882 (2006.01)
A61K 36/8988 (2006.01)
A61K 47/69 (2017.01)

(52) U.S. Cl.
CPC .............. *A61K 36/69* (2013.01); *A61K 36/64* (2013.01); *A61K 36/882* (2013.01); *A61K 36/8988* (2013.01); *A61K 47/6951* (2017.08); *A61K 2236/331* (2013.01); *A61K 2236/333* (2013.01); *A61K 2236/37* (2013.01); *A61K 2236/53* (2013.01)

(58) Field of Classification Search
CPC ........................... A61K 36/69; A61K 36/8988
See application file for complete search history.

(56) References Cited

PUBLICATIONS

Liu Qihua, et. al. Journal Tradit. Chin. Med. 2015, 35(3), 355-360.*

* cited by examiner

*Primary Examiner* — Qiuwen Mi
(74) *Attorney, Agent, or Firm* — Zhigang Ma

(57) ABSTRACT

The present disclosure relates to the technical field of traditional Chinese medicine, and more specifically, to a traditional Chinese medicine composition with improving cognition effect, its preparation method and a traditional Chinese medicine preparation. In parts by weight, the traditional Chinese medicine composition is made from 1-20 parts of *Gastrodiae rhizoma*, 1-15 parts of *Polygala tenuifolia* Willd., 1-30 parts of *Acorus tatarinowii*, 0.1-10 parts of *Cistanche deserticola* Ma, 0.1-10 parts of *Rehmanniae radix praeparata*, and 0.01-1 parts of curcumin. The pharmacodynamic substances of *Gastrodiae rhizoma*, *Polygala tenuifolia* Willd., *Acorus tatarinowii*, *Cistanche deserticola* Ma and *Rehmanniae radix praeparata* are extracted completely, concentrated and dried as much as possible. The volatile oil of *Acorus tatarinowii* and curcumin are encapsulated and dried by the volatile oil encapsulation technology. The dry powder of the traditional Chinese medicine compound extract is evenly mixed with the volatile oil encapsulation compound.

4 Claims, No Drawings

TRADITIONAL CHINESE MEDICINE COMPOSITION WITH IMPROVING COGNITION EFFECT, PREPARATION METHOD THEREOF AND TRADITIONAL CHINESE MEDICINE PREPARATION

TECHNICAL FIELD

The present disclosure relates to the technical field of traditional Chinese medicine, and more specifically, to a traditional Chinese medicine composition with improving cognition effect, its preparation method and a traditional Chinese medicine preparation.

BACKGROUND ART

With the increasing trend of aging in the world year by year, mild cognitive impairment (MCI) and vascular cognitive impairment (VCI), as the transition state from normal aging to dementia, have attracted more and more attention. In developed countries, the mortality rate of Alzheimer's disease ranks fourth after heart disease, tumor and apoplexy. With the aging of the world population, the disease has become one of the most serious problems facing geriatrics. Mild cognitive impairment in the early stage of Alzheimer's disease is recognized as a highly prevalent and preventable syndrome. At present, there is no specific treatment for Alzheimer's patients. FDA approved drugs can improve the symptoms of dementia in a short time, but can not slow down the development of the disease. Actively carrying out the research, prevention and treatment of MCI and VCI is of great significance to improve the quality of life of patients.

Active intervention on mild cognitive impairment is an effective measure to delay the further decline of cognitive function, but there are few reports on the intervention measures of mild cognitive impairment, and there are only individual multicenter studies on drugs. Therefore, a systematic study on the treatment status and progress of mild cognitive impairment at home and abroad is carried out. Because the most common subtype of mild cognitive impairment is amnestic cognitive impairment, that is, the early stage of Alzheimer's disease, the intervention strategies for mild cognitive impairment mostly follow the treatment scheme of Alzheimer's disease.

Traditional Chinese medicine prescriptions such as heart-benefiting recipe and kidney-tonifying recipe can protect nerves and improve learning and memory. The deterioration of brain cognitive function is closely related to "kidney deficiency". Dementia will gradually occur in the year of kidney deficiency, lack of source of essence, loss of nourishment of medullary sea and loss of use of spiritual mechanism. At the same time, in old age, the viscera are weak and the physiological or pathological products cannot be eliminated in time, accumulate in the body, generate phlegm and blood stasis, and the phlegm covers the clear orifices and/or blocks the brain collaterals, so that the brain Qi is not connected with the organs, and the spiritual mechanism is out of use, leading to dementia. Clinical research shows that the symptoms of deficiency of kidney Qi, turbid phlegm covering orifices and obstruction of brain collaterals account for 97%, 78% and 76% respectively.

The patent with the Application No. CN1973887A discloses a pharmaceutical composition, which is made of a certain proportion of *Gastrodiae rhizoma, Pheretima, Acorus tatarinowii, Polygala tenuifolia* Willd., *Rehmanniae radix praeparata* and *Cistanche deserticola* Ma as raw materials, which can be used to improve memory. However, the extraction of pharmacodynamic components in the prescription is not complete, and other public technologies rarely mix the volatile oil with the traditional Chinese medicine extract. To solve the above problems, it is necessary to provide a traditional Chinese medicine preparation that fully extracts and retains the effective components and a preparation method thereof.

SUMMARY

In view of the above, the present disclosure provides a traditional Chinese medicine composition with improving cognition effect, a preparation method of the traditional Chinese medicine composition and a traditional Chinese medicine preparation. The traditional Chinese medicine composition has the effect of obviously improving cognition.

In order to achieve the above purpose, technical solutions of the present disclosure are specifically described as follows.

The present disclosure provides a traditional Chinese medicine composition with improving cognition effect. The traditional Chinese medicine composition is made from following raw materials: 1-20 parts by weight of *Gastrodiae rhizoma*, 1-15 parts by weight of *Polygala tenuifolia* Willd., 1-30 parts by weight of *Acorus tatarinowii*, 0.1-10 parts by weight of *Cistanche deserticola* Ma, 0.1-10 parts by weight of *Rehmanniae radix praeparata*, and 0.01-1 parts by weight of curcumin.

*Gastrodiae rhizoma*, recorded in Pharmacopoeia of The People's republic of China, is sweet in taste and mild in nature. It enters the liver meridian and has the effect of calming the liver, calming the wind and calming the shock. It is mainly used for headache and dizziness, limb numbness, infantile convulsion, epilepsy, hypertension and otogenic vertigo. The main component of *Gastrodiae rhizoma* is gastrodin, with a content of 0.33%~0.67%. In recent years, a large number of studies have been carried out on the pharmacological effects of *Gastrodiae rhizoma* and its components, and new progress has been made in the treatment of a variety of diseases dominated by nervous system. *Gastrodiae rhizoma* has the functions of brain protection, improving brain circulation, anti-convulsion, anti-vertigo, anti-anxiety, analgesia, benefiting intelligence and delaying aging. Clinically, it is mostly used as an adjuvant for vertebrobasilar insufficiency, neuropsychiatric symptoms, vascular dementia and epilepsy.

*Polygala tenuifolia* Willd. has the activities of eliminating phlegm and relieving cough, benefiting intelligence and calming nerves, anti-aging, relaxing smooth muscle, anti-mutagenesis, anti-cancer, immune activity, bacteriostasis, sedation and hypnosis, anti-convulsion, anti-depressant and so on. The treatment of Alzheimer's disease (AD) mainly through: improving the function of cholinergic system; anti-oxidant and scavenging free radical; protecting neurons; anti-anxiety and inhibition of central nervous system. *Polygala tenuifolia* Willd. saponins have the effects of enhancing learning ability, antioxidation, bacteriostasis, anti-inflammatory, calming nerves, relieving cough and phlegm and lowering blood pressure. *Polygala tenuifolia* Willd. oligosaccharide esters have neuroprotective, promoting neuronal proliferation, anti-dementia, anti-depression, improving learning and memory, sedative and hypnosis, antioxidant, anti-inflammatory and other activities.

Different chemical components of *Acorus tatarinowii* have good effects in the central nervous system, cardiovascular and cerebrovascular system and digestive system, and have the effects of anticonvulsant, anti-depression, sedative and hypnosis, antitussive and antiasthmatic and antitumor. Clinically, it is used in the treatment of epilepsy, amnesia and aphasia caused by apoplexy, tinnitus, senile dementia and other diseases. Volatile oil has two-way regulating effects of excitation and inhibition on the central nervous system, and has protective effects on nerve cells, intelligence and brain. It has antiarrhythmic, antithrombotic and protective effects on cardiomyocytes and blood vessels.

*Cistanche deserticola* Ma, containing phenylethanoid glycosides, has many functions such as strengthening Yang, antioxidation, anti-aging, enhancing memory, and has protecting effects on myocardial ischemia and cerebral ischemia-reperfusion injury. *Cistanche deserticola* Ma saccharides have pharmacological effects on immune regulation, anti-aging, improving spleen deficiency, anti-virus and anti-tumor, promoting hematopoiesis and so on.

*Rehmanniae radix praeparata* polysaccharide has the functions of enhancing hematopoiesis, enhancing immunity, antioxidation, anti-mutation, central inhibition, anti-tumor activity, strengthening heart, reducing blood pressure, protecting myocardium, inhibiting thrombosis and reducing blood lipid.

Curcumin can reduce the damage of nerve function, reduce the water content of brain tissue and reduce the expression level of MMP-9. It can restore the reduced AKT and p-AKT cells in hippocampal CA1 region of APP/PS1 double transgenic mice with Alzheimer's disease (AD), suggesting that curcumin may further regulate the insulin signal transduction pathway of PI3K/AKT by regulating AKT and its phosphorylation process, so as to play an anti-AD role. Curcumin treatment can reduce the expression of COX-2 and 5-lipoxygenase (5-LOX) mRNA and protein in hippocampal neurons of epileptic rats induced by pilocarpine, which may reduce epileptic brain injury and play a neuroprotective role by affecting the expression of arachidonic acid metabolic pathways COX-2 and 5-LOX.

*Gastrodiae rhizoma* used in the compound of the disclosure has the function of dredging collaterals, *Polygala tenuifolia* Willd. and *Acorus tatarinowii* have the function of opening orifices, *Cistanche deserticola* Ma and *Rehmanniae radix praeparata* have the function of tonifying the kidney. The brain cognition can be improved from three aspects above. Curcumin in turmeric is recognized as one of the ingredients to improve brain cognition and Alzheimer's disease. The compound traditional Chinese medicine formed by the combination of the above drugs has been proved by pharmacological experiments to improve brain cognition.

The compound extraction method is used to extract the prescription. The pharmacodynamic substances of *Gastrodiae rhizoma, Polygala tenuifolia* Willd., *Acorus tatarinowii, Cistanche deserticola* Ma and *Rehmanniae radix praeparata* are extracted completely, concentrated and dried as much as possible. The volatile oil of *Acorus tatarinowii* and curcumin are encapsulated and dried by the volatile oil encapsulation technology. The dry powder of the traditional Chinese medicine compound extract is evenly mixed with the volatile oil encapsulation compound, which is the final traditional Chinese medicine composition.

Preferably, the traditional Chinese medicine composition is made from following raw materials: 16-20 parts by weight of *Gastrodiae rhizoma*, 10-14 parts by weight of *Polygala tenuifolia* Willd., 16-20 parts by weight of *Acorus tatarinowii*, 5-7 parts by weight of *Cistanche deserticola* Ma, 5-7 parts by weight of *Rehmanniae radix praeparata*, and 0.05-0.15 parts by weight of curcumin.

Preferably, the traditional Chinese medicine composition is made from following raw materials: 18 parts by weight of *Gastrodiae rhizoma*, 12 parts by weight of *Polygala tenuifolia* Willd., 18 parts by weight of *Acorus tatarinowii*, 6 parts by weight of *Cistanche deserticola* Ma, 6 parts by weight of *Rehmanniae radix praeparata*, and 0.1 parts by weight of curcumin.

The disclosure provides the preparation method for the traditional Chinese medicine composition, including the following steps.

Ethanol extraction: heating and refluxing *Gastrodiae rhizoma* and *Polygala tenuifolia* Willd. with ethanol aqueous solution, and collecting ethanol extraction solution and ethanol extraction residue.

Water extraction: heating and refluxing *Acorus tatarinowii* with water, and collecting *Acorus tatarinowii* solution, *Acorus tatarinowii* residue and *Acorus tatarinowii* volatile oil; heating and refluxing *Cistanche deserticola* Ma, *Rehmanniae radix praeparata*, the ethanol extraction residue, the *Acorus tatarinowii* residue with water, and collecting water extraction solution.

Filtration and concentration: mixing the ethanol extraction solution, the *Acorus tatarinowii* solution and the water extraction solution to obtain a mixing solution, and filtrating and concentrating the mixing solution to obtain an extractum.

Encapsulation: mixing the *Acorus tatarinowii* volatile oil and curcumin, and obtaining micropellets by cyclodextrin encapsulating.

Mixing: mixing the extractum and the micropellets.

Preferably, in the ethanol extraction step, the volume percentage concentration of the ethanol aqueous solution is 50-80%.

In the specific embodiments provided by the disclosure, in the ethanol extraction step, the volume percentage concentration of the ethanol aqueous solution is 70%.

Preferably, in the ethanol extraction step, the ethanol aqueous solution is used in the amount of 8-20 times of the total weight of the *Gastrodiae rhizoma* and the *Polygala tenuifolia* Willd. And the number of heating and refluxing is 1-5 times, and 0.5-3 hours each time.

In the specific embodiments provided by the disclosure, in the ethanol extraction step, the ethanol aqueous solution is used in the amount of 10 times of the total weight of the *Gastrodiae rhizoma* and the *Polygala tenuifolia* Willd. And the number of heating and refluxing is 3 times, and 1 hour each time.

Preferably, in the water extraction step, 8-30 times the weight of the water is added into the *Acorus tatarinowii* for heating and refluxing, and the number of heating and refluxing is 1-3 times, and 3-5 hours each time, and the *Acorus tatarinowii* solution, the *Acorus tatarinowii* residue and the *Acorus tatarinowii* volatile oil are collected. Water 8-30 times the total weight of medicinal materials is added into the *Acorus tatarinowii* solution, *Acorus tatarinowii* residue and *Acorus tatarinowii* volatile oil, and the number of heating and refluxing is 1-5 times, and 0.5-3 hours each time, and the water extraction solution is collected.

In the specific embodiments provided by the disclosure, 14 times the weight of the water is added into the *Acorus tatarinowii* for heating and refluxing, and the number of heating and refluxing is 1 time, and 5 hours each time.

In the specific embodiments provided by the disclosure, in the water extraction step, 10 times the weight of the water is added into the *Acorus tatarinowii* solution, *Acorus tata-*

*rinowii* residue and *Acorus tatarinowii* volatile oil, and the number of heating and refluxing is 2 times, and 1.5 hours each time.

Preferably, in the encapsulation step, the weight ratio of the mixture of the *Acorus tatarinowii* volatile oil and the curcumin to β-cyclodextrin is 1:(1-5). The polishing time during the encapsulation is 1-4 hours, and the drying temperature is 40-60° C.

In the specific embodiments provided by the disclosure, in the encapsulation step, the weight ratio of the mixture of the *Acorus tatarinowii* volatile oil and the curcumin to β-cyclodextrin is 1:1.5. The polishing time during the encapsulation is 2 hours, and the drying temperature is 45° C.

The present disclosure also provides a traditional Chinese medicine preparation. The traditional Chinese medicine preparation is composed of the traditional Chinese medicine composition of the present disclosure and pharmaceutically acceptable excipients.

Preferably, the dosage forms of the traditional Chinese medicine preparation are capsules, tablets or granules.

The present disclosure provides a traditional Chinese medicine composition with improving cognition effect, a preparation method of the traditional Chinese medicine composition and a traditional Chinese medicine preparation. The traditional Chinese medicine composition is made from following raw materials: 1-20 parts by weight of *Gastrodiae rhizoma*, 1-15 parts by weight of *Polygala tenuifolia* Willd., 1-30 parts by weight of *Acorus tatarinowii*, 0.1-10 parts by weight of *Cistanche deserticola* Ma, 0.1-10 parts by weight of *Rehmanniae radix praeparata*, and 0.01-1 parts by weight of curcumin. The disclosure has the following technical effects.

*Gastrodiae rhizoma* used in the compound of the disclosure has the function of dredging collaterals, *Polygala tenuifolia* Willd. and *Acorus tatarinowii* have the function of opening orifices, *Cistanche deserticola* Ma and *Rehmanniae radix praeparata* have the function of tonifying the kidney. The brain cognition can be improved from three aspects above. Curcumin in turmeric is recognized as one of the ingredients to improve brain cognition and Alzheimer's disease. The compound traditional Chinese medicine formed by the combination of the above drugs has been proved by pharmacological experiments to improve brain cognition.

In the disclosure, the compound extraction method is used to extract the prescription. The pharmacodynamic substances of *Gastrodiae rhizoma*, *Polygala tenuifolia* Willd., *Acorus tatarinowii*, *Cistanche deserticola* Ma and *Rehmanniae radix praeparata* are extracted completely, concentrated and dried as much as possible. The volatile oil of *Acorus tatarinowii* and curcumin are encapsulated and dried by the volatile oil encapsulation technology. The dry powder of the traditional Chinese medicine compound extract is evenly mixed with the volatile oil encapsulation compound, which is the final traditional Chinese medicine composition. The traditional Chinese medicine extraction composition of the disclosure is explored through two processes to obtain the preparation method of the composition. The pharmacodynamic experiment shows that the composition has the effect of significantly improving cognition.

DETAILED DESCRIPTION OF THE EMBODIMENTS

A traditional Chinese medicine composition with improving cognition effect, a preparation method of the traditional Chinese medicine composition and a traditional Chinese medicine preparation are disclosed. Those skilled in the art can learn from the contents of the description and appropriately improve the realization of process parameters. In particular, it should be noted that all similar substitutions and modifications are obvious to those skilled in the art, and they are considered to be included in the present disclosure. The method and application of the disclosure have been described through preferred embodiments. It is obvious that relevant personnel can realize and apply the technology of the disclosure by changing or appropriately changing and combining the method and application described herein without departing from the content, spirit and scope of the disclosure.

The raw materials or excipients used in the traditional Chinese medicine composition with improving cognition effect, its preparation method and the traditional Chinese medicine preparation can be purchased from the market.

The disclosure is further described below in combination with the embodiments.

Embodiment 1 Traditional Chinese Medicine Composition and its Preparation Method 1. The formula of this embodiment was:
*Gastrodiae rhizoma* 180 g, *Polygala tenuifolia* Willd. 120 g, *Acorus tatarinowii* 180 g, *Cistanche deserticola* Ma 60 g, *Rehmanniae radix praeparata* 60 g, and curcumin 1 g.
2. The preparation method was as follows.
  (1) *Gastrodiae rhizoma* and *Polygala tenuifolia* Willd. were heated and refluxed with 10 times of 70% ethanol aqueous solution for 3 times, 1 hour each time, and the solution and residue were collected respectively.
  (2) *Acorus tatarinowii* was heated and refluxed with 14 times of water once for 5 hours, and the solution, residue and volatile oil were collected.
  (3) *Cistanche deserticola* Ma, *Rehmanniae radix praeparata*, the residue collected in steps (1) and (2) are heated and refluxed with 10 times of water twice for 1.5 hours each time, and the solution was collected.
  (4) All the solution obtained in steps (1), (2) and (3) was filtrated and concentrated to obtain the extractum.
  (5) The volatile oil obtained in step (2) and curcumin were mixed, and the micropellets were obtained by cyclodextrin encapsulating. The weight ratio of the mixture of the volatile oil and curcumin to β-cyclodextrin was 1:1.5, the grinding time was 2 hours, and the drying temperature was 45° C.
  (6) The extractum obtained in step (4) and the micropellets obtained in step (5) were mixed to obtain the traditional Chinese medicine composition.

Comparative Example 1

1. The formula of this example was:
*Gastrodiae rhizoma* 180 g, *Polygala tenuifolia* Willd. 120 g, *Acorus tatarinowii* 180 g, *Cistanche deserticola* Ma 60 g, *Rehmanniae radix praeparata* 60 g, and curcumin 1 g.
2. The preparation method was as follows.
  (1) *Gastrodiae rhizoma* was grinded into powder and passed through No. 6 pharmacopoeia sieve.
  (2) *Polygala tenuifolia* Willd., *Acorus tatarinowii*, *Cistanche deserticola* Ma and *Rehmanniae radix praeparata* were decocted with 10 times the amount of water twice for 2 hours each time, and the solution was collected.
  (3) All the solution obtained in step (2) was filtrated and concentrated to obtain the extractum.

(4) The extractum obtained in step (2), the *Gastrodiae rhizoma* powder obtained in step (1) and the curcumin were mixed.

Comparative Example 2

1. The formula of this example was:
*Gastrodiae rhizoma* 180 g, *Polygala tenuifolia* Willd. 120 g, *Acorus tatarinowii* 180 g, *Cistanche deserticola* Ma 60 g, *Rehmanniae radix praeparata* 60 g, and curcumin 1 g.

2. The preparation method was as follows.
(1) The crude *Gastrodiae rhizoma* powder was heated and refluxed with 70% ethanol aqueous solution for 3 times, 2 hours each time. The drug-liquid ratio was 10 times, 8 times and 8 times respectively. The extracted solution was collected, filtrated and cyclone dried to obtain a dry extract.
(2) The *Polygala tenuifolia* Willd. was heated and refluxed with 80% ethanol aqueous solution for 3 times, 2 hours each time. The drug-liquid ratio was 10 times, 8 times and 8 times respectively. The extracted solution was collected, filtrated and cyclone dried to obtain a dry extract.
(3) The *Acorus tatarinowii* was heated and refluxed with 10 times the amount of water for 3 times, 2 hours each time. The drug-liquid ratio was 10 times, 8 times and 8 times respectively. The extracted solution was collected, filtrated and cyclone dried to obtain a dry extract.
(4) The *Cistanche deserticola* Ma was heated and refluxed with 10 times the amount of water for 3 times, 2 hours each time. The drug-liquid ratio was 10 times, 8 times and 8 times respectively. The extracted solution was collected, filtrated and cyclone dried to obtain a dry extract.
(5) The *Cistanche deserticola* Ma was heated and refluxed with 10 times the amount of water for 3 times, 2 hours each time. The drug-liquid ratio was 10 times, 8 times and 8 times respectively. The extracted solution was collected, filtrated and cyclone dried to obtain a dry extract.
(6) The *Rehmanniae radix praeparata* was heated and refluxed with 10 times the amount of water for 3 times, 2 hours each time. The drug-liquid ratio was 10 times, 8 times and 8 times respectively. The extracted solution was collected, filtrated and cyclone dried to obtain a dry extract.
(7) The dry extracts obtained in steps (1)-(6) were mixed with the curcumin.

Comparative Example 3

1. The formula of this example was:
*Gastrodiae rhizoma* 300 g, *Pheretima* 200 g, *Acorus tatarinowii* 300 g, *Polygala tenuifolia* Willd. 200 g, *Rehmanniae radix praeparata* 100 g, and *Cistanche deserticola* Ma 100 g.

2. The preparation method was as follows.
(1) *Gastrodiae rhizoma*, *Pheretima*, *Acorus tatarinowii*, *Polygala tenuifolia* Willd., *Rehmanniae radix praeparata*, and *Cistanche deserticola* Ma were decocted with 10 times the amount of water twice for 2 hours each time, and the solution was collected.
(2) All the solution obtained in step (1) was filtrated and concentrated to obtain the extractum.

Embodiment 1 Efficacy Test

Drugs to be tested: Embodiment 1 group, comparative example 1 group, comparative example 2 group and comparative example 3 group. Positive drug: huperzine-A.

1. Object Recognition Test
Test Method:
Adaptation period: on the first day, the mice were placed in the test room for 1 hour of environmental adaptation and familiarity, and then placed in the open field box for 20 minutes (there was no object in the box), so as to eliminate the impact of the open field box on the tested mice. After the experiment of each mouse, the open field box was cleaned with 75% ethanol.

Familiarization period: on the second day (24 hours after the adaptation period), the mice were placed in the test room for 1 hour of environmental adaptation and familiarization, then two yellow cylindrical bottles of the same size and texture were placed at the left and right ends of the same side of the open field box as familiar objects, and then the mouse was put into the box with its back towards the objects. The mouse's exploration of the objects within 5 min was recorded (timing standard: the exploration time within 2 cm of the mouse's nose or mouth from the object, and its lying on the objects or just walking around the objects was not included). After the experiment of each mouse, the open field box was cleaned with 75% ethanol.

Test period: 2 h after the familiarization period, replace a yellow cylindrical bottle in the open field box was replaced with a green conical bottle of the same size as a strange object, and then the mouse was put into the box with its back towards the objects. The total exploration time of novel object (Tn) and the total exploration time of familiar object (Tf) were recorded. The recognition index (RI) was calculated: $RI=Tn/(Tn+Tf)$. After the experiment of each mouse, the open field box was cleaned with 75% ethanol.

Statistical methods: the data were analyzed by GraphPad Prism 7.01 software (GraphPad Software, Inc., San Diego, California, USA). Before the parameter test of all group tests, the data were tested by normality test (Kolmogorov-Smirnov test) and variance homogeneity test (Levene test). Except for the escape latency in water maze, all test parameters were compared between groups by non paired T-test (single tail), and the test level was set as $p<0.05$. The escape latency in water maze was compared between two groups by two-way analysis of variance. The post test was conducted by Sidak's multiple comparisons test, and the test level was set as $p<0.05$. The results are shown in Table 1:

TABLE 1

Effects of the drugs to be tested on the recognition index in the novel object recognition test of mice

| Groups | Dose (crude drug) | Number of animals/pieces | Recognition index ($\bar{x}\pm SE$) |
|---|---|---|---|
| Control group | — | 17 | 0.5715 ± 0.06626 |
| Model group | — | 17 | 0.4180 ± 0.02726* |
| Positive drug group | 0.67 tablets/kg | 17 | 0.5341 ± 0.04280# |
| Embodiment 1 group | 1.002 g/kg | 17 | 0.5322 ± 0.04504# |
| Comparative example 1 group | 1.002 g/kg | 17 | 0.5081 ± 0.05318 |
| Comparative example 2 group | 1.002 g/kg | 17 | 0.5269 ± 0.04310# |

TABLE 1-continued

Effects of the drugs to be tested on the recognition
index in the novel object recognition test of mice

| Groups | Dose (crude drug) | Number of animals/pieces | Recognition index ($\bar{x} \pm SE$) |
|---|---|---|---|
| Comparative example 3 group | 1.200 g/kg | 17 | 0.5050 ± 0.03855# |

Note:
compared with the control group,
*p < 0.05;
compared with the model group,
p < 0.05.

Novel object recognition test is a fine and sensitive behavioral method to detect the recognition memory of animals by using the instinct of animals to approach and explore novel objects. It can be seen from the statistical data that the recognition index of the model group decreased significantly compared with the normal control group, while the recognition index of the positive drug group, embodiment 1 group, comparative example 1 group, comparative example 3 group increased significantly after intragastric administration. The results showed that the declarative memory ability of mice in the model group decreased and the model was successfully established. The declarative memory ability of stressed mice could be improved after the treatment of positive drug group, embodiment 1 group, comparative example 1 group, comparative example 3 group. In the embodiment 1 group, the recognition index was the highest and closest to the control group.

2. Spatial Learning Ability Test of Mice by Step-Down Test

Test method: the grouping, sample preparation and modeling of mouse step-down test were the same as above. At the beginning of the test, the step-down training was carried out, where the adaptation was carried out for 3 min and then the power on training was carried out for 300 s. The test was conducted after 24 hours. The drug was administered 1 hour before the test, and scopolamine hydrobromide and normal saline were injected intraperitoneally 15-20 minutes before the test. Then the mouse was put on the platform and the latency of jumping off the platform for the first time and the number of errors (getting off the platform) within 300 s were recorded. If the mouse did not jump off the platform within 300 s, the number of errors was recorded as 0 and the latency was recorded as 300 s.

The results are shown in Table 2 and 3:

TABLE 2

Effects of the drugs to be tested on the
latency in the step-down test of mice

| Groups | Dose (crude drug) | Number of animals/pieces | Latency/s |
|---|---|---|---|
| Control group | — | 17 | 100.3 ± 31.82 |
| Model group | — | 17 | 42.01 ± 13.95* |
| Positive drug group | 0.67 tablets/kg | 17 | 94.12 ± 29.48# |
| Embodiment 1 group | 1.002 g/kg | 17 | 137.7 ± 25.71## |
| Comparative example 1 group | 1.002 g/kg | 17 | 103.5 ± 28.91# |
| Comparative example 2 group | 1.002 g/kg | 17 | 108.2 ± 25.66# |
| Comparative example 3 group | 1.200 g/kg | 17 | 83.39 ± 23.71 |

Note:
compared with the control group,
*p < 0.05,
**p < 0.01;
compared with the model group,
p < 0.05,
p < 0.01.

TABLE 3

Effects of the drugs to be tested on the number
of errors in the step-down test of mice

| Groups | Dose (crude drug) | Number of animals/pieces | Number of errors ($\bar{x} \pm SE$) |
|---|---|---|---|
| Control group | — | 17 | 1.375 ± 0.2869 |
| Model group | — | 17 | 2.714 ± 0.3696** |
| Positive drug group | 0.67 tablets/kg | 17 | 1.833 ± 0.3445# |
| Embodiment 1 group | 1.002 g/kg | 17 | 1.667 ± 0.3333# |
| Comparative example 1 group | 1.002 g/kg | 17 | 2.471 ± 0.5153 |
| Comparative example 2 group | 1.002 g/kg | 17 | 2.600 ± 0.5589 |
| Comparative example 3 group | 1.200 g/kg | 17 | 2.824 ± 0.5767 |

Note:
compared with the control group,
*p < 0.05,
**p < 0.01;
compared with the model group,
p < 0.05,
p < 0.01.

After intragastric administration, the latency of the model group was significantly shorter than that of the control group, the number of errors was significantly increased, and the model was successfully established. After intragastric administration, the latencies of the positive drug group, embodiment 1 group, comparative example 1 group and comparative example 2 group were significantly longer than that of the model group. The numbers of errors in positive drug group and embodiment 1 group were significantly lower than that in the model group. The results showed that the memory ability of the model group mice in the step-down test was defective. The positive drug group and embodiment 1 group could improve the memory function defect of the step-down test. The above research shows that the drug combination of the disclosure can improve the defect of spatial memory ability of mice to a certain extent and can significantly improve the memory ability of step-down test of mice.

3. Spatial Learning Ability Test of Mice by Morris Water Maze Test

Implementation method: the test procedure included two parts: directional navigation and space exploration. A total of 5 consecutive days were tested. The first part was the directional navigation experiment, which was tested on mice for 4 days, and the second part was the space exploration experiment, which was tested for 1 day. The melanin edible toner was washed away with warm water to hide the platform, and it was kept in sharp contrast with the color of mice during camera shooting for easy tracking. The platform was located 0.8 cm below the water surface and the water depth was 21 cm. It was located in the NW quadrant. The water temperature in the water maze was maintained at a constant temperature of 22-24° C. with a heating rod.

Directional navigation experiment: each mouse was trained 4 times a day, with an interval of 15-20 min. During the test, the water entry point was selected in a semi random way each time. The experimenter held the mouse by hand, made it face the pool wall, and gently put it into the water. In each training, if the mouse could find the platform within 60 s, and the time spent on the platform was more than 2 S, it was regarded as the sign of successful platform search. The time spent by the mice from entering the water to successful platform search was recorded as the latency. If the mouse failed to find the platform within 60 s, the experimenter guided it to the platform by hand, and the latency was 60 s. After the mice boarded the platform, the mice were kept on the platform for 10 s, so that they could carry out spatial learning and memory according to the reference objects of the four quadrants, and the tension of the mice were reduced. The average value of daily latency was calculated to evaluate the acquisition ability of animals' spatial memory.

Space exploration experiment: the platform was removed and each mouse was tested once for 60 s. The SE quadrant was selected and the mouse was gently put into the water facing the edge of the pool wall. The spatial memory ability of the animal was evaluated by the number of times the animal crossed the original platform position within 60 s, the run ratio and time ratio of the original platform quadrant (i.e. the ratio of the run and time of the animal's original platform quadrant to the total run and time).

The results are shown in table 4-8:

TABLE 4

Effects of the drugs to be tested on escape latency in water maze test of mice

| Groups | Dose (crude drug) | Number of animals/pieces | First day (s) ($\bar{x}\square SE$) | Second day (s) ($\bar{x}\square SE$) | Third day (s) ($\bar{x}\square SE$) | Fourth day (s) ($\bar{x}\square SE$) |
|---|---|---|---|---|---|---|
| Control group | — | 17 | 45.8 ± 2.51 | 34.0 ± 2.90 | 26.1 ± 2.50 | 27.0 ± 2.68 |
| Model group | — | 17 | 53.2 ± 2.18 | 44.2 ± 2.77 | 42.4 ± 2.93 | 47.7 ± 2.37**** |
| Positive drug group | 0.67 tablets/kg | 17 | 52.7 ± 2.29 | 44.5 ± 2.80 | 43.6 ± 2.91 | 43.5 ± 2.83 |
| Embodiment 1 group | 1.002 g/kg | 17 | 50.3 ± 2.48 | 40.5 ± 2.92 | 39.0 ± 3.12 | 35.8 ± 2.76 |
| Comparative example 1 group | 1.002 g/kg | 17 | 49.9 ± 2.56 | 49.9 ± 2.33 | 46.2 ± 2.71 | 39.0 ± 2.75 |
| Comparative example 2 group | 1.002 g/kg | 17 | 46.4 ± 2.89 | 46.8 ± 2.74 | 46.3 ± 2.84 | 40.6 ± 2.81 |
| Comparative example 3 group | 1.200 g/kg | 17 | 49.9 ± 2.50 | 44.1 ± 2.69 | 44.9 ± 2.80 | 45.5 ± 2.54 |

TABLE 5

Effects of the drugs to be tested on the escape latency in the exploration period in the water maze test of the mice

| Groups | Dose (crude drug) | Number of animals/pieces | Escape latency/s ($\bar{x}\square SE$) |
|---|---|---|---|
| Control group | — | 17 | 20.05 ± 3.983 |
| Model group | — | 17 | 39.27 ± 4.814** |
| Positive drug group | 0.67 tablets/kg | 17 | 22.91 ± 3.922# |
| Embodiment 1 group | 1.002 g/kg | 17 | 24.45 ± 4.652# |
| Comparative example 1 group | 1.002 g/kg | 17 | 32.12 ± 5.158 |
| Comparative example 2 group | 1.002 g/kg | 17 | 30.16 ± 5.256 |
| Comparative example 3 group | 1.200 g/kg | 17 | 27.10 ± 4.234# |

TABLE 6

Effects of the drugs to be tested on the stay time in the target quadrant during the exploration escape latency in the water maze test of the mice

| Groups | Dose (crude drug) | Number of animals/pieces | Stay time in target quadrant/s ($\bar{x}\square SE$) |
|---|---|---|---|
| Control group | — | 17 | 17.30 ± 0.8384 |
| Model group | — | 17 | 14.15 ± 1.354* |
| Positive drug group | 0.67 tablets/kg | 17 | 15.04 ± 0.9555 |
| Embodiment 1 group | 1.002 g/kg | 17 | 16.04 ± 0.7052 |
| Comparative example 1 group | 1.002 g/kg | 17 | 15.60 ± 0.9211 |
| Comparative example 2 group | 1.002 g/kg | 17 | 15.11 ± 0.8451 |
| Comparative example 3 group | 1.200 g/kg | 17 | 15.88 ± 1.3682 |

TABLE 7

Effects of the drugs to be tested on the target quadrant run distance in the exploration period in the water maze test of the mice

| Groups | Dose (crude drug) | Number of animals/pieces | Run distance of target quadrant/mm ($\bar{x}\square SE$) |
|---|---|---|---|
| Control group | — | 17 | 2821 ± 167.1 |
| Model group | — | 17 | 2373 ± 175.4 |

TABLE 7-continued

Effects of the drugs to be tested on the target quadrant run distance in the exploration period in the water maze test of the mice

| Groups | Dose (crude drug) | Number of animals/pieces | Run distance of target quadrant/mm ($\bar{x}\square SE$) |
|---|---|---|---|
| Positive drug group | 0.67 tablets/kg | 17 | 2867 ± 207.6 |
| Embodiment 1 group | 1.002 g/kg | 17 | 2804 ± 143.7 |
| Comparative example 1 group | 1.002 g/kg | 17 | 2531 ± 208.0 |
| Comparative example 2 group | 1.002 g/kg | 17 | 2413 ± 178.2 |
| Comparative example 3 group | 1.200 g/kg | 17 | 2539 ± 175.9 |

TABLE 8

Effects of the drugs to be tested on the number of crossing the platform in the exploration period in the water maze test of the mice

| Groups | Dose (crude drug) | Number of animals/pieces | Number of crossing platform ($\bar{x}\square SE$) |
|---|---|---|---|
| Control group | — | 17 | 3.125 ± 0.3966 |
| Model group | — | 17 | 1.308 ± 0.3820** |
| Positive drug group | 0.67 tablets/kg | 17 | 2.786 ± 0.4591# |
| Embodiment 1 group | 1.002 g/kg | 17 | 2.647 ± 0.4922# |
| Comparative example 1 group | 1.002 g/kg | 17 | 2.006 ± 0.4180 |
| Comparative example 2 group | 1.002 g/kg | 17 | 1.967 ± 0.4008 |
| Comparative example 3 group | 1.200 g/kg | 17 | 2.433 ± 0.4563 |

Note (Table 48): compared with the control group, *$p<0.05$,$p<0.01$,**$p<0.0001$; compared with the model group, #$p<005$.

After intragastric administration, the number of crossing the platform in the model group was significantly lower than that in the control group, and increased after the intervention of the drug to be test. The run ratio and time of the target quadrant were significantly higher than those in the model group. It is suggested that the drug to be tested can improve the defect of spatial memory ability in mice to a certain extent. On the 4th day of the water maze test, the escape latency of the model group was significantly longer than that of the control group, suggesting that the memory storage ability of the model group mice was defective. During the exploration period of water maze, the escape latency in the model group was significantly longer than that in the control group, and the stay time in the target quadrant and the number of crossing the platform in the model group were significantly lower than those in the control group, suggesting that the memory retrieval ability of the model group was impaired. After intragastric administration, the escape latency of the positive drug group, embodiment 1 group and comparative example 3 group was significantly shorter than that of the model group, and the number of crossing the platform was significantly higher than that of the model group, suggesting that the positive drug, embodiment 1 group and comparative example 3 group could improve the defect of spatial memory retrieval ability of mice, and the defect of spatial extraction ability of mice could be improved in different degrees in the comparative example 1 group and comparative example 2 group.

Based on the results of classic animal memory triple behavioral tests, namely object recognition test, step-down test and water maze test, the results show that the formula of the disclosure has the trend and effect of improving cognition and memory of mice, and the optimized preparation process can better realize the drug effect, which is better than the traditional extraction process.

The above is only the preferred embodiments of the disclosure. It should be pointed out that for ordinary technicians in the technical field, several improvements and refinements can be made without departing from the principles of the disclosure, and these improvements and refinements should also be regarded as the protection scope of the disclosure.

What is claimed is:

1. A traditional Chinese medicine composition with improving cognition effect, wherein the traditional Chinese medicine composition is made from following raw materials:
    16-20 parts by weight of *Gastrodiae rhizoma*, 10-14 parts by weight of *Polygala tenuifolia* Willd., 16-20 parts by weight of *Acorus tatarinowii*, 5-7 parts by weight of *Cistanche deserticola* Ma, 5-7 parts by weight of *Rehmanniae radix praeparata*, and 0.05-0.15 parts by weight of curcumin;
    wherein the traditional Chinese medicine composition is prepared by a method comprising the following steps:
    ethanol extraction: heating and refluxing *Gastrodiae rhizoma* and *Polygala tenuifolia* Willd. with ethanol aqueous solution, and collecting an ethanol extraction solution and an ethanol extraction residue;
    water extraction: heating and refluxing *Acorus tatarinowii* with water, and collecting *Acorus tatarinowii* solution, *Acorus tatarinowii* residue and *Acorus tatarinowii* volatile oil; heating and refluxing *Cistanche deserticola* Ma, *Rehmanniae radix praeparata*, the ethanol extraction residue, the *Acorus tatarinowii* residue with water, and collecting a water extraction solution;
    filtration and concentration: mixing the ethanol extraction solution, the *Acorus tatarinowii* solution and the water extraction solution to obtain a mixing solution, and filtrating and concentrating the mixing solution to obtain an extractum;
    encapsulation: mixing the *Acorus tatarinowii* volatile oil and curcumin, and obtaining micropellets by cyclodextrin encapsulating; and
    mixing: mixing the extractum and the micropellets.

2. The traditional Chinese medicine composition of claim 1, wherein the traditional Chinese medicine composition is made from following raw materials: 18 parts by weight of *Gastrodiae rhizoma*, 12 parts by weight of *Polygala tenuifolia* Willd., 18 parts by weight of *Acorus tatarinowii*, 6 parts by weight of *Cistanche deserticola* Ma, 6 parts by weight of *Rehmanniae radix praeparata*, and 0.1 parts by weight of curcumin.

3. A traditional Chinese medicine preparation, wherein the traditional Chinese medicine preparation is composed of the traditional Chinese medicine composition of claim 1 and pharmaceutically acceptable excipients.

4. The traditional Chinese medicine preparation of claim 3, wherein a dosage form of the traditional Chinese medicine preparation is a capsule, a tablet or a granule.

\* \* \* \* \*